United States Patent [19]

Taga et al.

[11] Patent Number: 4,879,925

[45] Date of Patent: Nov. 14, 1989

[54] HYDRAULIC CONTROL SYSTEM FOR AUTOMATIC TRANSMISSION, INCORPORATING FAIL SAFE AND PROGRESSIVE CREEP CONTROL AND HILL HOLD CONTROL

[75] Inventors: Yutaka Taga; Yuji Kashihara, both of Toyota, Japan

[73] Assignee: Toyota Jidosha Kabushiki Kaisha, Aichi, Japan

[21] Appl. No.: 109,305

[22] Filed: Oct. 16, 1987

[30] Foreign Application Priority Data

| Oct. 21, 1986 | [JP] | Japan | 61-250423 |
| Oct. 21, 1986 | [JP] | Japan | 61-250424 |
| Oct. 21, 1986 | [JP] | Japan | 61-250425 |
| Oct. 21, 1986 | [JP] | Japan | 61-250426 |

[51] Int. Cl.$^4$ ............................................. B60K 41/16
[52] U.S. Cl. ............................................. 74/867; 74/868; 74/869
[58] Field of Search ............... 74/867, 868, 869, 866; 192/1.33, 1.35

[56] References Cited

U.S. PATENT DOCUMENTS

| 3,771,630 | 11/1973 | Koivunen | 192/1.33 X |
| 3,890,856 | 6/1975 | Miyauchi et al. | 74/867 X |
| 3,893,698 | 7/1975 | Fontaine | 192/1.33 X |
| 4,478,108 | 10/1984 | Nishimura et al. | 74/867 X |
| 4,513,639 | 4/1983 | Hiramatsu | 74/867 X |
| 4,526,065 | 7/1985 | Rosen et al. | 74/867 X |
| 4,643,049 | 2/1987 | Nishikawa et al. | 74/867 X |
| 4,644,826 | 2/1987 | Kubo et al. | 74/866 |
| 4,648,289 | 3/1987 | Kubo et al. | 74/866 |
| 4,686,872 | 8/1987 | Aoki et al. | 74/869 |
| 4,784,020 | 11/1988 | Hamano et al. | 74/867 X |

FOREIGN PATENT DOCUMENTS

61-55455 3/1986 Japan .

Primary Examiner—Leslie A. Braun
Assistant Examiner—William Gehris
Attorney, Agent, or Firm—Oliff & Berridge

[57] ABSTRACT

A hydraulic hill hold control system for an automatic transmission for a vehicle adapted for the purpose of hill hold, wherein the supply of hydraulic pressure to the brake is interlocked with the shifting of the hydraulic speed stage switching system so that the brake is engaged only when the gear transmission mechanism is at a certain speed stage at which the brake is in any event engaged and therefore the engagement of the brake for hill hold does not interfere with the forward driving operation of the gear transmission mechanism.

6 Claims, 3 Drawing Sheets

HYDRAULIC CONTROL SYSTEM FOR AUTOMATIC TRANSMISSION, INCORPORATING FAIL SAFE AND PROGRESSIVE CREEP CONTROL AND HILL HOLD CONTROL

BACKGROUND OF THE INVENTION

The present invention relates to a hydraulic control system for an automatic transmission, and more particularly relates to such an automatic transmission hydraulic control system which is capable of providing effective and fail safe anti creep control and also hill holding control.

The present invention has been described in Japanese patent applications Ser. Nos. Showa 61-250423 (1986), Showa 61-250424 (1986), Showa 61-250425 (1986), and Showa 61-250426 (1986), all of which were filed by an applicant the same as the entity assigned or owed duty of assignment of the present patent application; and the present patent application hereby incorporates into itself by reference the texts of said Japanese Patent Applications and the claims and the drawings thereof; copies are appended to the present application.

When a vehicle equipped with an automatic transmission is stationary or nearly stationary, as for example when waiting at traffic lights, it is per se conventional to provide some form of anti creep action, in order to prevent the vehicle from springing forward on the occasion of some inadvertence of the driver. In other words, even though a manual range setting means controlled by the driver of the vehicle is still set to a forward vehicle operational range such as "D" or drive range, it is per se known to set the transmission of the vehicle, effectively, to a neutral operational speed stage or to an operational speed stage which is equivalent to neutral. This can be done, for example, by releasing a forward clutch of the transmission, or by much reducing the torque transmission capacity of such a forward clutch so that it slips to a certain degree, or by reducing the torque transmission capacity of a hydraulic coupling of the transmission so that the engine torque is at least not completely transmitted to the gear transmission mechanism of the transmission.

Further, when such a vehicle equipped with an automatic transmission is stationary or nearly stationary upon an upward slope, as for example on a hill, in order to prevent the vehicle slipping backwards and in order to facilitate the process of starting up again to progress up the slope, it is per se conventional to provide a so called hill hold control mode, in which, for example, one of the shift brakes incorporated in the gear transmission mechanism of the transmission is engaged, so that the output shaft of the transmission is not able to rotate in the direction to allow the vehicle to move in the backwards direction. Such a type of construction is disclosed, for example, in Japanese Patent Application Laying Open Publication Ser. No. 61-55455 (1986), which it is not hereby intended to admit as prior art to the present patent application except to the extent in any case mandated by applicable law.

However, various problems arise with such a type of construction.

Namely, this type of hill hold control is really only applicable when the vehicle is stationary or substantially stationary and anti creep control is being carried out. If this is not the case, then the engagement of the shift brake for providing such hill hold control will amount to the engagement of a previously prohibited combination of friction engaging devices of the gear transmission mechanism, so that when said shift brake is engaged said gear transmission mechanism will be subjected to a massive torque shock, and this can seriously affect the durability of said gear transmission mechanism and of the friction engaging devices incorporated in it.

For example, to consider a particular typical constructional case for such a transmission, suppose that the shift brake for providing such hill hold control is a second coast brake which prevents the rotation of a sun gear of the gear transmission mechanism, then if, for example, while the transmission is operating in its "D" or drive range and the gear transmission mechanism is engaged to its third speed stage and the vehicle is in a decelerating operational condition, mistakenly said second coast brake is engaged, a direct clutch which is provided for directly coupling said sun gear with the input element of that portion of the gear transmission mechanism which provides the third speed stage and also said second coast brake will be applied simultaneously, and this will effectively amount to an attempt to prevent the power output shaft of the transmission from rotating. Accordingly, a very large torque shock will be engendered in the transmission, and this will be transmitted to the various members of the power train such as in particular the friction engaging devices of the gear transmission mechanism, thus adversely affecting the durability of the transmission as a whole.

Further, a subsidiary problem can occur, that if the hill hold control is undesirably released while the engagement pressure of such a forward clutch of the transmission is still being kept relatively low in order to provide anti creep control, there is a risk of the vehicle slipping in the reverse direction.

Yet another problem that can occur with such a system is that relatively sudden changes in the torque transmission capacity of such a forward clutch which is being used for providing anti creep control can themselves cause relatively high transmission torque shock.

A further, and final, problem that gives difficulties is that, for the above described type of hill hold control, the engagement hydraulic fluid pressure for a shift brake such as a second coast brake is typically determined as being the line pressure of the transmission; but, in fact, when for example the transmission is set to its second speed stage while operating in its "S" or second range, it would actually be preferable to determine said engagement hydraulic fluid pressure for said second coast brake to be a pressure such as a second coast modulate pressure, which is different from the line pressure and substantially lower than said line pressure.

SUMMARY OF THE INVENTION

The inventors of the present invention have considered the problems detailed above in the aforementioned type of automatic transmission hydraulic control system, and have considered various possibilities for improvement of the anti creep control and of the hill hold functions thereof.

Accordingly, it is the primary object of the present invention to provide an improved hydraulic control system for an automatic transmission, which avoids the problems detailed above.

It is a further object of the present invention to provide such an automatic transmission hydraulic control system, which, while being effective for providing hill hold control, effectively prevents the possibility of submitting the gear transmission mechanism of the transmission to any massive torque shock.

It is a further object of the present invention to provide such an automatic transmission hydraulic control system, which ensures that it should not happen that, effectively, an attempt is made to prevent the power output shaft of the transmission from rotating.

It is a further object of the present invention to provide such an automatic transmission hydraulic control system, which preserves the durability of the automatic transmission.

It is a further object of the present invention to provide such an automatic transmission hydraulic control system, which particularly prevents a shift brake incorporated in the automatic transmission from being erroneously engaged.

It is a further object of the present invention to provide such an automatic transmission hydraulic control system, which particularly preserves the durability of the friction engaging devices incorporated in the automatic transmission.

It is a yet further object of the present invention to provide such an automatic transmission hydraulic control system, which positively ensures that there is no risk of the hill hold control being released while the actuating hydraulic fluid pressure which is being fed to a forward clutch is still low so that anti creep control is still being performed.

It is a yet further object of the present invention to provide such an automatic transmission hydraulic control system, which provides a reliable type of hill hold control which positively ensures that there is no risk of the vehicle slipping in the reverse direction.

It is a yet further object of the present invention to provide such an automatic transmission hydraulic control system, which is not subject to relatively sudden changes in the torque transmission capacity of such a forward clutch which is being used for providing anti creep control causing relatively high transmission torque shock.

It is a yet further object of the present invention to provide such an automatic transmission hydraulic control system, which modifies the engagement hydraulic fluid pressure for a shift brake which is being used both for hill hold control and also for speed change control of the transmission, according to operational circumstances.

According to a first aspect of the present invention, these and other objects are attained by, for an automatic transmission for a vehicle comprising an engine, comprising a gear transmission mechanism which comprises a plurality of hydraulic fluid pressure actuated friction engaging mechanisms and which is capable of providing any one of a plurality of speed stages according to patterns of engagement and of release of said hydraulic fluid pressure actuated friction engaging mechanisms; said friction engaging mechanisms including a certain one thereof which is a shift brake and according to engagement of which a power output shaft of said gear transmission mechanism is prevented from turning in the direction to allow said vehicle to move in the backwards direction: a hydraulic control system, comprising: (a) a means for providing anti creep control when said vehicle is substantially stationary and said engine is substantially in idling operational condition and said automatic transmission is being operated in a certain operating range; (b) a shift valve which switches so as to carry out switchover of certain ones of the speed stages of said gear transmission mechanism; and: (c) a means for, when anti creep control is being provided, supplying actuating hydraulic fluid pressure via said shift valve to said shift brake so as to engage said shift brake, so that said actuating hydraulic fluid pressure is only thus supplied to said shift brake when said shift valve is in a certain switched position. Optionally but preferably, said shift valve may be one which is switched in a first manner so as to establish the first speed stage and the second speed stage of said gear transmission mechanism, and is switched in a second manner so as to establish speed stages of said gear transmission mechanism higher than said second speed stage thereof; and said actuating hydraulic fluid pressure may then be only thus supplied to said shift brake when said shift valve is in its said first switched position.

According to such a construction as described above, this automatic transmission hydraulic control system has the function that the supply of actuating hydraulic fluid pressure to said shift brake goes through said shift valve, and therefore only can be performed when said shift valve is in its said certain switched position. For example, if the shift brake is a second coast brake, the supply of actuating hydraulic fluid pressure to said shift brake to engage said shift brake for providing hill hold operation can only be performed when said shift valve is switched to its position for providing the first or the second speed stage of the gear transmission mechanism; but, if at some other time when said shift valve is switched to its position for providing a speed stage higher than the second speed stage, by error a mistaken instruction for performing hill hold operation is issued, then said shift valve intercepts the putative supply of actuating hydraulic fluid pressure to said shift brake to engage it, and aborts said supply. Accordingly, the shift brake cannot be wrongly engaged, and torque shock to the various components of the transmission is avoided and the durability of the transmission as a whole, and particularly of the friction engaging devices thereof, is enhanced.

And, according to a second aspect of the present invention, these and other objects are attained by, for an automatic transmission for a vehicle comprising an engine, comprising a hydraulic coupling which receives rotational power from said engine, and a gear transmission mechanism which receives rotational power from said hydraulic coupling and which comprises a plurality of hydraulic fluid pressure actuated friction engaging mechanisms and which is capable of providing any one of a plurality of speed stages according to patterns of engagement and of release of said hydraulic fluid pressure actuated friction engaging mechanisms; said friction engaging mechanisms including a certain one thereof which is a forward clutch which selectively rotationally connects a rotational power output member of said hydraulic coupling with a rotational power input member of said gear transmission mechanism for forward vehicle operation, and another certain one thereof which is a shift brake and according to engagement of which a power output shaft of said gear transmission mechanism is prevented from turning in the direction to allow said vehicle to move in the backwards direction: a hydraulic control system, comprising: (a) a clutch control valve which reduces the actuating hydraulic fluid pressure for said forward clutch according to a signal hydraulic fluid pressure which said clutch control valve receives; (b) a brake control valve which switches over according to said signal hydraulic fluid pressure and which controls the supply of actuating hydraulic fluid pressure to said shift brake; and: (c) a means for supplying said signal hydraulic fluid pressure both to said clutch control valve and to said brake control valve.

According to such a construction as described above, in this automatic transmission hydraulic control system, the same hydraulic fluid pressure is used to control the clutch control valve and to control the brake control valve, so control of the reduction of the actuating hydraulic fluid pressure for the forward clutch and engagement and disengagement of the shift brake are completely linked together, so that when the shift brake is released the forward clutch is always engaged, and thereby inadvertent rolling of the vehicle in the backwards direction due to insufficient pressure to the forward clutch, when the shift brake is released to stop performing hill hold control, is positively prevented.

Further, according to a third aspect of the present invention, these and other objects are attained by, for For an automatic transmission for a vehicle comprising an engine, comprising a hydraulic coupling which receives rotational power from said engine, and a gear transmission mechanism which receives rotational power from said hydraulic coupling and which comprises a plurality of hydraulic fluid pressure actuated friction engaging mechanisms and which is capable of providing any one of a plurality of speed stages according to patterns of engagement and of release of said hydraulic fluid pressure actuated friction engaging mechanisms; said friction engaging mechanisms including a certain one thereof which is a forward clutch which selectively rotationally connects a rotational power output member of said hydraulic coupling with a rotational power input member of said gear transmission mechanism for forward vehicle operation, and another certain one thereof which is a shift brake and according to engagement of which a power output shaft of said gear transmission mechanism is prevented from turning in the direction to allow said vehicle to move in the backwards direction: a hydraulic control system, comprising: (a) a clutch control valve which reduces the actuating hydraulic fluid pressure for said forward clutch according to a signal hydraulic fluid pressure which said clutch control valve receives; and: (b) a means for supplying said signal hydraulic fluid pressure to said clutch control valve, which quantitatively adjusts the value of said signal hydraulic fluid pressure.

According to such a construction as described above, this automatic transmission hydraulic control system ensures that the actuating hydraulic fluid pressure for said forward clutch, as set by said clutch control valve, is not suddenly varied as by ON/OFF variation when anti creep control is supplied for the transmission or is stopped being supplied, but on the contrary said actuating hydraulic fluid pressure for said forward clutch is gradually and continuously varied. Thereby, sudden changes in the torque transmission capacity of said forward clutch are avoided, and severe torque shock to the components of the transmission is avoided.

Finally, according to a fourth aspect of the present invention, these and other objects are attained by, for an automatic transmission for a vehicle comprising an engine, comprising a gear transmission mechanism which comprises a plurality of hydraulic fluid pressure actuated friction engaging mechanisms and which is capable of providing any one of a plurality of speed stages according to patterns of engagement and of release of said hydraulic fluid pressure actuated friction engaging mechanims; said friction engaging mechanisms including a certain one thereof which is a shift brake and according to engagement of which a power output shaft of said gear transmission mechanism is prevented from turning in the direction to allow said vehicle to move in the backwards direction: a hydraulic control system, comprising: (a) a means for, when said vehicle is substantially stationary and said engine is substantially in idling operational condition and said automatic transmission is being operated in a certain operating range and anti creep control is being provided, supplying a first certain hydraulic fluid pressure as actuating hydraulic fluid pressure for said shift brake; (b) a means for, when certain ones of said speed stages of said gear transmission mechanism are to be provided, supplying a second certain hydraulic fluid pressure as actuating hydraulic fluid pressure for said shift brake; and: (c) a means for, when either one of said first certain hydraulic fluid pressure and said second certain hydraulic fluid pressure is being supplied as actuating hydraulic fluid pressure for said shift brake, prohibiting such supply of the other one thereof. Optionally but preferably, this prohibition means may be a check valve.

According to such a construction as described above, by the action of the prohibition means, this automatic transmission hydraulic control system allows different actuating hydraulic fluid pressures to be supplied to said shift brake, when said shift brake is being used for providing hill hold control, and when said shift brake is being used for engaging a particular one or ones of the speed stages of the transmission for normal vehicle operation. Accordingly, the engagement pressure of said shift brake can be set differently and indeed independently in these two cases, as is desirable.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference symbols, unless otherwise so specified, denote the same parts and so on in the various figures; and:

DESCRIPTION OF THE PREFERRED EMBODIMENT

The present invention will now be described with reference to the preferred embodiment thereof, and with reference to the figures.

OVERALL POWER TRAIN STRUCTURE

Figure 1:
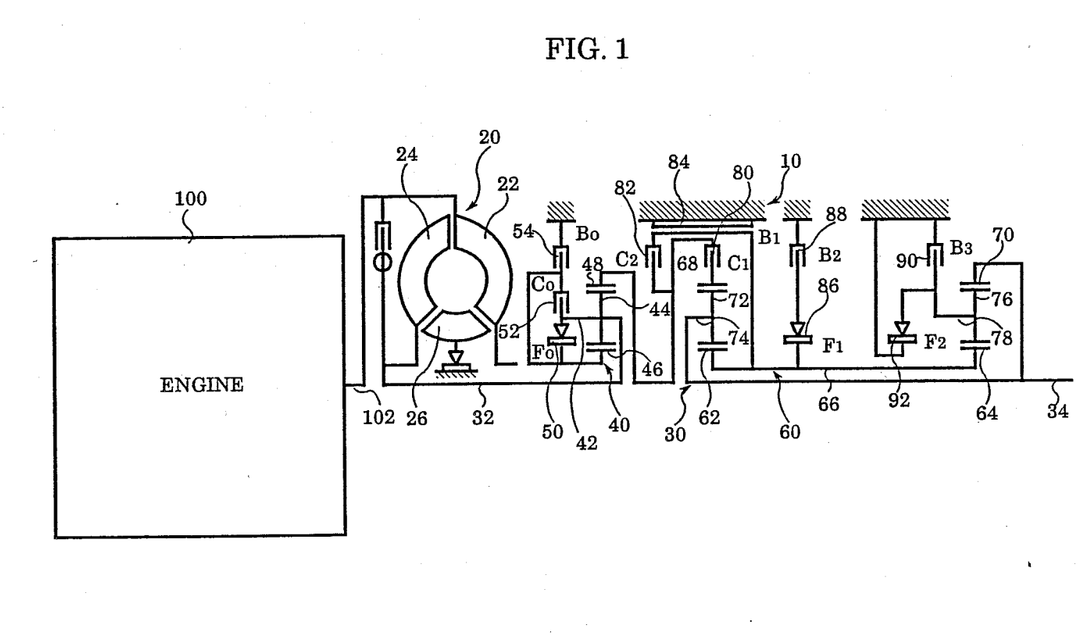
FIG. 1 is a schematic longitudinal skeleton view of a power train of an automotive vehicle, which is used as an example for explaining the application of the preferred embodiment of the automatic transmission hydraulic control system of the present invention.

FIG. 1 is a schematic longitudinal skeleton view of a power train of an automotive vehicle, to which the preferred embodiment of the automatic transmission hydraulic control system of the present invention is applied. In this figure, the reference numeral 100 denotes an engine (shown only by a schematic block) of the automotive vehicle, while the reference numeral 10 denotes an automatic transmission system of said vehicle, said automatic transmission system 10 being made up from a torque converter mechanism 20 and a gear transmission mechanism 30; and this gear transmission mechanism 30 itself comprises an auxiliary gear transmission mechanism 40 and a main gear transmission mechanism 60.

The torque converter mechanism 20 is itself of a per se conventional construction, being a three element one stage two phase type, and comprises a pump impeller 22 which is rotationally driven by the power output shaft 102 of the engine 100, said power output shaft 102 therefore functioning as a rotational power input member for the automatic transmission system 10 as a whole. The torque converter mechanism 20 also comprises a turbine member 24 and a stator member 26, which is mounted to the casing (only schematically shown) of the transmission so as to be rotatable in one rotational direction only via a one way clutch not denoted by any reference numeral. And the turbine member 24 is rotationally connected to a first intermediate shaft 32, said first intermediate shaft 32 thereby functioning as a rotational power output member for this torque converter mechanism 20 and, as will be seen hereinafter, also functioning as a rotational power input member for the gear transmission mechanism 30 as a whole and particularly for the auxiliary gear transmission mechanism 40 thereof. The casing, not particularly shown, of this torque converter mechanism 20 is filled with hydraulic fluid, and in a per se conventional manner, by circulation of this hydraulic fluid round and round in this torque converter mechanism 20 between the pump impeller 22, the turbine member 24, and the stator member 26 thereof in the general flow pattern of a smoke ring, torque is transmitted from the pump impeller 22 to the turbine member 24 with a certain amount of slippage being permitted therebetween, while functions of torque amplification and also of fluid clutching action are also provided.

Referring next to this gear transmission mechanism 30, the rotational power input member of which is constituted by the aforementioned first intermediate shaft 32 and the rotational power output member of which is constituted by a power output shaft 34 which leads to and transmits rotational power to at least one pair (not particularly shown) of the wheels of the vehicle to which this transmission system is fitted, the overall function of this gear transmission mechanism 30 is to rotationally couple together said first intermediate shaft 32 and said power output shaft 34 with one or the other of a plurality of different rotational speed reduction ratios being provided between said first intermediate shaft 32 and said power output shaft 34 according to which of a plurality of different speed stages said gear transmission mechanism 30 is set to, as well as with an uncoupled or disengaged condition being provided between said first intermediate shaft 32 and said power output shaft 34 when said gear transmission mechanism 30 is set to a neutral speed stage. The gear transmission mechanism 30 includes the previously mentioned auxiliary gear transmission mechanism 40, which receives input rotational power from the first intermediate shaft 32 and which furnishes output rotational power to a second intermediate shaft 33. This auxiliary gear transmission mechanism 40 comprises a planetary gear mechanism of a per se conventional type which comprises a carrier 42 which is rotationally coupled to the first intermediate shaft 32, a sun gear 46, a ring gear 48, and a plurality of planetary pinions 44 which are rotationally mounted to the carrier 42 and which are meshed between the sun gear 46 and the ring gear 48 and which perform planetary movement between said two members in a per se known manner. The sun gear 46 is always rotationally connected to the carrier 42 with regard to mutual rotational movement in one rotational sense only by a one way clutch (FO) 50 and further is selectively rotationally connected to said carrier 42 with regard to mutual rotational movement in both rotational senses by an overdrive clutch (CO) 52, and further said sun gear 46 is also selectively rotationally connected to the casing (only schematically shown) of this gear transmission mechanism 30 with regard to mutual rotational movement in both senses, i.e. is selectively braked, by an overdrive brake (BO) 54. Thus, when the overdrive clutch (CO) 52 is put into a disengaged condition and the overdrive brake (BO) 54 is put into an engaged condition, as will be more particularly described hereinafter, and the first intermediate shaft 32 is rotated to input rotational power to this auxiliary gear transmission mechanism 40, then the sun gear 46 is prevented from rotating while the carrier 42 and its planetary pinions 44 perform planetary movement about said sun gear 46, and thereby the ring gear 48 and the second intermediate shaft 33 fixedly coupled thereto are driven at a rotational speed higher than the rotational speed of the first intermediate shaft 32 and bearing a determinate ratio thereto, and thereby as a whole the auxiliary gear transmission mechanism 40 is set to provide an overdrive operational condition. On the other hand, when the overdrive clutch (CO) 52 is put into an engaged condition and the overdrive brake (BO) 54 is put into a disengaged condition, again as will be more particularly described hereinafter, and the first intermediate shaft 32 is rotated to input rotational power to this auxiliary gear transmission mechanism 40, then the sun gear 46 and the carrier 42 and its planetary pinions 44 are rotationally coupled together and rotate as a unit, and thereby the ring gear 48 and the second intermediate shaft 33 fixedly coupled thereto are also rotationally coupled to this unit and rotate with it at the same rotational speed, and thereby as a whole the auxiliary gear transmission mechanism 40 is set to provide a directly coupled operational condition.

The gear transmission mechanism 30 further includes the previously mentioned main gear transmission mechanism 60, which receives input rotational power from the second intermediate shaft 33 and which furnishes output rotational power to the power output shaft 34. This main gear transmission mechanism 60 is of a planetary gear type providing three forward speed stages and one reverse speed stage. The front stage thereof is constituted by a front planetary gear mechanism of a per se conventional type, which comprises a front carrier 74 which is fixedly rotationally coupled to the power output shaft 34, a front sun gear 62, a front ring gear 68, and a plurality of front planetary pinions 72 which are rotationally mounted to the front carrier 74 and which are meshed between the front sun gear 62 and the front ring gear 68 and which perform planetary movement between said two members in a per se known manner. The front sun gear 46 is fixedly provided on one end of an intermediate shaft 66 on the rear end of which a rear sun gear 64 incorporated in a rear planetary gear mechanism is fixedly provided. This second planetary gear mechanism comprises said rear sun gear 64, a rear carrier 78, a rear ring gear 70 which is fixedly rotationally coupled to the power output shaft 34, and a plurality of rear planetary pinions 76 which are rotationally mounted to the rear carrier 78 and which are meshed between the rear sun gear 64 and the rear ring gear 70 and which perform planetary movement between said two members in a per se known manner. The front ring gear 68 is selectively rotationally connected to the ring gear 48 of the auxiliary gear transmission mechanism 40 with regard to mutual rotational movement in both rotational senses by a forward clutch (C1) 80, and said ring gear 48 of said auxiliary gear transmission mechanism 40 further is selectively rotationally connected to the intermediate shaft 66 with regard to mutual rotational movement in both rotational senses by a direct clutch (C2) 82. Also, said intermediate shaft 66 is further selectively rotationally connected to the casing (only schematically shown) of this gear transmission mechanism 30 with regard to mutual rotational movement in both senses, i.e. is selectively braked, by a second coast brake (B1) 84. Moreover, this intermediate shaft 66 is further selectively rotationally connected to said casing of said gear transmission mechanism 30 with regard to mutual rotational movement in one rotational sense only by a one way clutch (F1) 86 which is locked only during the engine drive operational condition and by a second brake (B2) 88. Further, the rear carrier 78 of the rear planetary gear mechanism is always rotationally connected to said casing of said gear transmission mechanism 30 with regard to mutual rotational movement in one rotational sense only by a one way clutch (F2) 92 which is similarly locked only during the engine drive operational condition. Also, said rear carrier 78 of said rear planetary gear mechanism is selectively rotationally connected to said casing of said gear transmission mechanism 30 with regard to mutual rotational movement in both rotational senses by a first and reverse brake (B3) 90.

Thus, when the two clutches 80 and 82 and the three brakes 84, 88, and 90 are engaged and disengaged in various combinations, this gear transmission mechanism 30 can be set to provide any one of three forward speed stages (speed reduction ratios) and one reverse speed stage, and particularly shown in the following Table, in which a "O" means that the corresponding clutch or brake is in the engaged condition, a "X" means that the corresponding clutch or brake is in the disengaged condition, and a "T" means that the corresponding one way clutch is in the engaged or locked state only during the engine drive operational condition while said one way clutch is in the freewheeling state during the engine braking operational condition. In the "L" range of this automatic transmission system, the second speed stage upshift is never carried out, but on the other hand the downshift from the second speed stage to the first speed stage is carried out.

TABLE

|  |  | C0 52 | C1 80 | C2 82 | B0 54 | B1 84 | B2 88 | B3 90 | F0 50 | F1 86 | F2 92 |
|---|---|---|---|---|---|---|---|---|---|---|---|
| "P"- parking range | | O | X | X | X | X | X | X | X | X | X |
| "R"- reverse range | | O | X | O | X | X | X | O | X | X | X |
| "N"- neutral range | | O | X | X | X | X | X | X | X | X | X |
| "D" drive range | 1st | O | O | X | X | X | X | X | T | X | T |
| | 2nd | O | O | X | X | X | O | X | T | T | X |
| | 3rd | O | O | O | X | X | O | X | T | X | X |
| | O/D | X | O | O | O | X | O | X | X | X | X |
| "S" second range | 1st | O | O | X | X | X | X | X | T | X | T |
| | 2nd | O | O | X | X | O | O | X | T | T | X |
| | 3rd | O | O | O | X | X | O | X | T | X | X |
| "L" low range | 1st | O | O | X | X | X | X | O | T | X | T |
| | 2nd | O | O | X | X | O | O | X | T | T | X |

It should be understood that, although the details of their various constructions are not particularly disclosed in this specification, all of these clutches and brakes are friction engaging devices of per se conventional types, and they are actuated to be engaged by the provision of supply of hydraulic fluid pressure to pressure chambers which they incorporate, while otherwise they are disengaged when no such supply of hydraulic fluid pressure is thus provided to their said pressure chambers; and, further, the degree of engagement of any one of these clutches and brakes, i.e. the maximum torque level which it can transmit without substantial slippage, is determined according to the pressure level of said supply of actuating hydraulic fluid pressure supplied to it, and is the greater, the greater is said pressure level.

THE OVERALL TRANSMISSION CONTROL SYSTEM

Shortly, various details of the preferred embodiment of the hydraulic control device of the present invention will be described. This hydraulic control device is utilized for supplying appropriate combinations of actuating hydraulic fluid pressures for controlling the engagement and the disengagement of the various clutches and brakes of the power train described above, so as to set the transmission as a whole to its state for providing any appropriate one of the various speed stages detailed in the Table. In fact, the control system for the transmission as a whole is of a hybrid electrical and hydraulic type, and, in general, an electrical portion of said transmission control system makes the logical decision as to what speed stage of the transmission is the appropriate one which is to be engaged, based upon the current values of various vehicle operating parameters such as vehicle road speed, engine load, and so on, and sends electrical signals appropriate for engaging said appropriate speed stage to certain solenoid valves, which then switch various hydraulic fluid pressures in the hydraulic portion of the transmission control system. This hydraulic transmission control device, which is the preferred embodiment of the automatic transmission hydraulic control system of the present invention, then in its turn, according to such switching, supplies the appropriate actuating hydraulic fluid pressures for controlling the engagement and the disengagement as detailed in the Table of the various clutches and brakes, so as to set the transmission as a whole to its state for providing said appropriate speed stage. And FIG. 2 shows in schematic sectional view essential portions of said preferred embodiment transmission hydraulic control device, and also shows certain of the above mentioned solenoid valves.

It should be understood that no concrete illustration of the structure of any particular realization of the electric or electronic portion of the overall transmission control system, functionally described above and also hereinafter in this specification, will be given herein, since various possibilities for the details thereof can be easily supplemented by one of ordinary skill in the electronic and computer programming art based upon the various functional disclosures set out in this specification. In the preferred embodiment of the present invention, this electrical portion may desirably be concretely realized as a micro computer and its associated circuitry, said micro computer operating at the behest of a control program; but, in the interests of brevity of disclosure, no particular details of said micro computer, or of the programming thereof, will be disclosed in this specification, since such details can likewise be easily supplemented by one of ordinary skill in the electronic and computer programming art based upon the functional disclosures set out herein. However, it should be particularly understood that such realizations in the micro computer form, although preferred, are not the only ways in which the electrical portion of the overall transmission control system can be provided; in other possible embodiments it could be constituted as an electrical device not incorporating a microprocessor. In the preferred case, however, such a microprocessor will typically comprise: a CPU (central processing unit) which obeys said control program and which inputs data, performs calculations, and outputs data; a ROM (read only memory) which stores said program and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for electrical signals outputted from various sensors and/or switches to the input port device, and drive circuits through which actuating electrical signals are passed from the output port device to the solenoids and so on.

STRUCTURE OF THIS HYDRAULIC CONTROL SYSTEM

Figure 2:
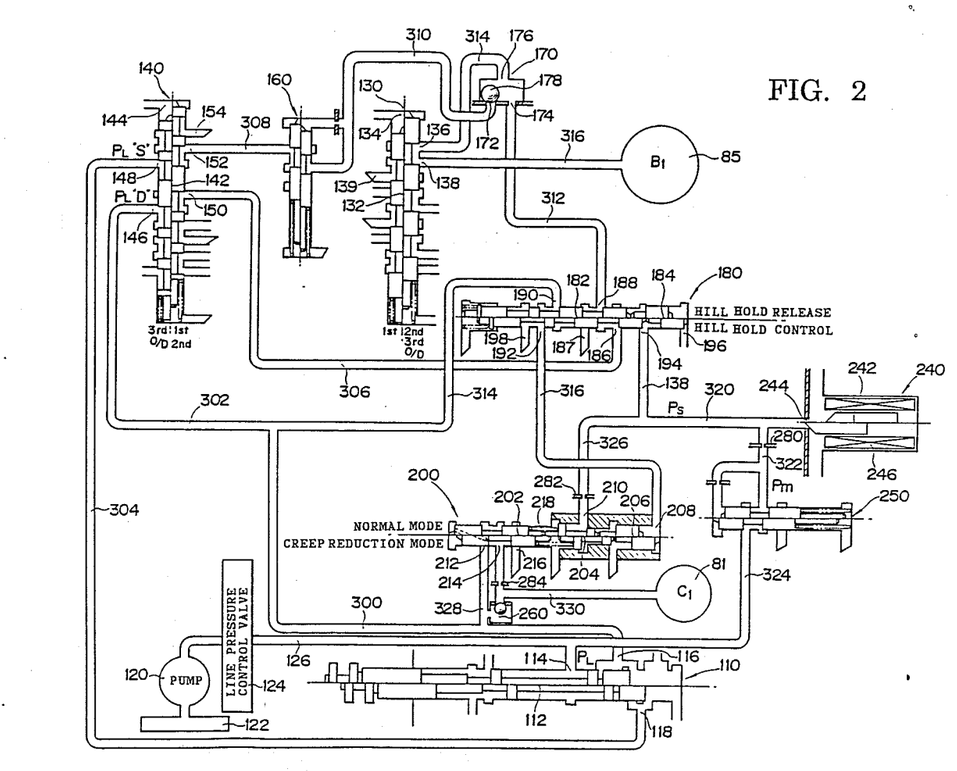
FIG. 2 is a schematic cross sectional view showing various hydraulic valves and other devices of said preferred embodiment automatic transmission hydraulic control system, and also various solenoid valves associated therewith.

Now to describe the preferred embodiment of the automatic transmission hydraulic control system of the present invention, referring to FIG. 2, the reference numeral 110 denotes a manual range setting valve of the automatic transmission. This manual range setting valve 110 is shown in longitudinal sectional view in the figure, and comprises a valve element 112 which is slidably mounted within a valve bore. The various axial positions for this valve element 112 represent the various operational ranges for the automatic transmission as shown in the Table, i.e. represent "P" or parking range, "R" or reverse range, "N" or neutral range, "D" or drive range, "S" or second range, and "L" or low range. The valve element 112 is positioned to one or another of its said axial positions by manual action exerted by the driver of the vehicle, as said driver positions a manual shift lever (not particularly shown) or the like typically provided in the passenger compartment of the vehicle to one or another of set positions thereof denoting said various transmission ranges, the movement of said manual shift lever or the like being linked, typically by a mechanical or electrical linkage, to the movement of the valve element 112 of this valve 110. One of the available positions for said valve element 112, corresponding to when said manual shift lever is set to the "S" or second range, is illustrated above the center line of the shown sectional view, while another of said available positions for said valve element 112, corresponding to when said manual shift lever is set to the "D" or drive range, is illustrated below said center line of said sectional view.

Particularly, the manual range setting valve 110 comprises a hydraulic input port 114 to which is supplied via a conduit 126 a line pressure denoted as P1 for this hydraulic control system, said line pressure P1 being generated by a pressure pump 120 which picks up hydraulic fluid from a sump 122 and pressurizes it to a pressure level which is then regulated by a line pressure control valve 124 to the pressure level P1 before said pressurized hydraulic fluid is supplied to said conduit 126. When the driver of the vehicle sets the manual shift lever or the like to its operational position denoting the "D" or drive transmission range, then the input port 114 of the manual range setting valve 110 is connected to a drive range output port 116 thereof as indicated below the center line of the sectional view of said valve 110 shown in FIG. 2, whereas on the other hand when the driver of the vehicle sets the manual shift lever or the like to its operational position denoting the "S" or second transmission range, then the input port 114 of the manual range setting valve 110 is connected to a second range output port 118 thereof as indicated above the center line of the sectional view of said valve 110 shown in FIG. 2. The drive range output port 116 is connected via a conduit 300 and another conduit 302 branching off therefrom to a drive range port denoted as 146 of a second/third shift valve 140, while the second range output port 118 is connected via another conduit 304 to a second range port denoted as 148 of said second/third shift valve 140.

This second/third shift valve 140 is constituted as a spool valve, and comprises a valve element 142 which reciprocatingly slides in a bore; a position of said valve element 142 upwardly displaced from the point of view of FIG. 2 is shown on the right side of the sectional view of that figure, while an opposite position of said valve element 142 downwardly displaced from said point of view of FIG. 2 is shown on the left side of said sectional view. A pressure chamber 144 is defined at the upper end of the second/third shift valve 140 as seen in the figure so that, when a control hydraulic fluid pressure is supplied to said pressure chamber 144, the valve element 142 is biased in the downward direction of the valve 140 as seen in the figure; and a biasing spring is fitted in a spring chamber defined at the lower end of said second/third shift valve 140 as seen in the figure, so as to bias said valve element 142 upwards in the bore of said valve as seen in the figure. The supply of control hydraulic fluid pressure to the pressure chamber 144 is provided from a solenoid valve of a per se conventional construction, not particularly shown in the figures, and said solenoid valve is operated by the electrical portion of the transmission control system so as to supply such control hydraulic fluid pressure, when and only when the transmission is to be set to its third speed stage or its overdrive speed stage. When the valve element 142 of this second/third shift valve 140 is in its upwardly displaced position as seen on the right of the FIG. 2 view, which as explained above is when the transmission system is to provide its first speed stage or its second speed stage, then the second range port 148 thereof is connected to an output port 152 thereof and the drive range port 146 thereof is connected to an output port 150 thereof; while, on the other hand, when said valve element 142 is in its downwardly displaced position as seen on the left of the FIG. 2 view, which as explained above is when the transmission system is to provide its third speed stage or its overdrive speed stage, then the second range port 148 thereof is disconnected from the output port 152 which instead is connected to a drain port 154, and the drive range port 146 thereof is disconnected from the output port 150. The output port 150 is connected via a conduit 306 to a port 186 of a brake control valve 180. On the other hand, the output port 152 is connected via a conduit 308 to an input port of a second coast modulator valve 160, an output port of which is connected via a conduit 310 to an input port 172 of a check valve 170. Although no particular details thereof are shown in the figure because they are not germane to the concept of the present invention, this second/third shift valve 140 further includes various other ports in addition to the ports 146, 148, 150 and 152, said other ports being appropriately switched over by said second/third shift valve 140 in a per se conventional way for performing the shift of speed stages of the transmission between the second speed stage thereof and the third speed stage thereof.

The check valve 170 is structured as a chamber type valve, and has two inputs ports—the input port 172 and another input port 174—and one output port 176. Inside the chamber of said check valve 170 there is housed a ball 178. The effect of this ball 178 is that, when hydraulic fluid pressure is supplied to the aforesaid input port 172, then said hydraulic fluid pressure is transmitted to the output port 176 but is blocked off by the ball 178 from being transmitted to the other input port 174; and, conversely, when hydraulic fluid pressure is supplied to said other input port 174, then said hydraulic fluid pressure is transmitted to the output port 176 but is blocked off by said ball 178 from being transmitted to the aforesaid input port 172. This other input port 174 is connected via a conduit 312 to a port 188 of the brake control valve 180, while the output port 176 is connected via a conduit 314 to a port 136 of a first/second speed shift valve 130.

This first/second shift valve 130 is likewise constituted as a spool valve, and comprises a valve element 132 which reciprocatingly slides in a bore; a position of said valve element 132 upwardly displaced from the point of view of FIG. 2 is shown on the right side of the sectional view of that figure, while an opposite position of said valve element 132 downwardly displaced from said point of view of FIG. 2 is shown on the left side of said sectional view. A pressure chamber 134 is defined at the upper end of the first/second shift valve 130 as seen in the figure so that, when a control hydraulic fluid pressure is supplied to said pressure chamber 134, the valve element 132 is biased in the downward direction of the valve 130 as seen in the figure; and a biasing spring is fitted in a spring chamber defined at the lower end of said first/second shift valve 130 as seen in the figure, so as to bias said valve element 132 upwards in the bore of said valve as seen in the figure. The supply of control hydraulic fluid pressure to the pressure chamber 134 is provided from a solenoid valve of a per se conventional construction, not particularly shown in the figures, and said solenoid valve is operated by the electrical portion of the transmission control system so as to supply such control hydraulic fluid pressure, when and only when the transmission is to be set to its first speed stage. When the valve element 132 of this first-/second shift valve 130 is in its upwardly displaced position as seen on the right of the FIG. 2 view, which as explained above is when the transmission system is to provide its second speed stage, its third speed stage or its overdrive speed stage, then the port 136 thereof is connected to an output port 138 thereof; while, on the other hand, when said valve element 132 is in its downwardly displaced position as seen on the left of the FIG. 2 view, which as explained above is when the transmission system is to provide its first speed stage, then said port 136 thereof is disconnected from said output port 138 which instead is connected to a drain port 139. The output port 138 is connected via a conduit 316 to a hydraulic servo pressure chamber 85 of the second coast brake (B1) 84. Although no particular details thereof are shown in the figure because they are not germane to the concept of the present invention, this first/second shift valve 130, like the second/third shift valve 140, further includes various other ports in addition to the ports 136, 138, 139, said other ports being appropriately switched over by said first/second shift valve 130 in a per se conventional way for performing the shift of speed stages of the transmission between the first speed stage thereof and the second speed stage thereof.

The brake control valve 180 is likewise constituted as a spool valve, and comprises a first longer valve element 182 and a second shorter valve element 184 both of which reciprocatingly slide in a bore and are axially abutted therein; a position of said valve elements 182 and 184 rightwardly displaced from the point of view of FIG. 2 is shown on the lower side of the sectional view of that figure, while an opposite position of said valve elements 182 and 184 leftwardly displaced from said point of view of FIG. 2 is shown on the upper side of said sectional view. A first pressure chamber to which a first control port 196 opens is defined between the right hand end as seen in the figure of the brake control valve 180 and the shorter valve element 184, and a second pressure chamber to which a second control port 194 opens is defined between the two valve elements 182 and 184 at an intermediate portion of the brake control valve 180 as seen in the figure, while a biasing spring is fitted in a spring chamber defined at the other left end of said brake control valve 180 as seen in the figure, so as to bias said valve elements 182 and 184 rightwards as seen in the figure in the bore of this brake control valve 180. According to this construction, when a control hydraulic fluid pressure Ps of pressure value at least equal to a determinate threshold pressure value Psset is supplied to at least one of these first and second control ports 194 and 196, then the valve element 182 (at least) is biased in the leftward direction as seen in the figure of the valve 180, which will be termed its hill hold control release position. On the other hand, when no such control hydraulic fluid pressure Ps of such pressure value at least equal to said determinate threshold pressure value Psset is supplied to either of these first and second control ports 194 and 196, then the valve element 182 is biased by the biasing spring in the rightward direction as seen in the figure of the valve 180, which will be termed its hill hold control position. When the valve element 182 of this brake control valve 180 is in its rightwardly displaced position as seen on the lower side of the FIG. 2 view, then the port 188 thereof is connected to an output port 186 thereof, while a port 190 thereof is discommunicated from a port 192 thereof which itself is connected to a drain port 198; while, on the other hand, when said valve element 182 is in its leftwardly displaced position as seen on the upper side of the FIG. 2 view, which as explained above is when the transmission system is to provide its first speed stage, then said port 186 thereof is disconnected from said output port 188 which instead is connected to a drain port 187, and further the ports 190 and 192 are connected together. The port 190 is connected via a conduit 314 and the aforementioned conduit 300 to the drive range output port 116 of the manual range setting valve 110; while the port 192 is connected via a conduit 316 to a control port 208 of a clutch control valve 200 which will be described shortly hereinafter. As for the control pressures, the supply of control hydraulic fluid pressure to the pressure chamber defined between the valve elements 182 and 184 is provided via a conduit 138 with a signal pressure Ps present within a conduit 320, as will be explained hereinafter; and the pressure chamber defined between the end of the brake control valve 180 and the shorter valve element 184 is provided through a conduit not particularly shown with the throttle hydraulic fluid pressure (which is a per se conventional pressure available within this type of transmission), or alternatively with the actuating hydraulic fluid pressure for the forward clutch (C1) 80.

To the conduit 320 there is connected a control port 244 of a solenoid valve 240. This solenoid valve 240 further comprises a solenoid coil 246 and a valve element 242 a tapered end portion of which opens or closes said control port 244 according to its axial position. When said solenoid coil 246 is not supplied with any substantial actuating electrical energy, then the valve element 242 is biased to the left as seen in FIG. 2, as shown schematically on the lower side of the center line of the solenoid valve 240 in the figure, by the action of a biasing means not shown in the figure such as a spring, so that said valve element 242 closes the control port 244, thus not disturbing any hydraulic fluid pressure which may be present in the conduit 320. On the other hand, when said solenoid coil 246 is supplied with actuating electrical energy, then the valve element 242 is attracted to the right as seen in FIG. 2, as shown schematically on the upper side of the center line of the solenoid valve 240 in the figure, by the magnetism induced in said solenoid coil 246 against the action of said biasing means which is overcome, so that said valve element 242 leaves the control port 244 open, thus draining any hydraulic fluid pressure in the conduit 320. And the solenoid coil 246 is supplied with a pulse electrical signal with a duty ratio which will be denoted as "D" by the electrical portion of the transmission control system, so that a signal pressure Ps is developed in the conduit 320 according to the value of said duty ratio D. Since as described above the solenoid valve 240 is of the normally closed type, the signal pressure Ps decreases along with increase in the duty ratio D. The basic pressure supply to the conduit 320 is provided through a throttling element 280, a conduit 322, a modulator valve 250, and a conduit 324 from the conduit 126, in which as explained previously the line pressure P1 is present. The modulator valve 250 is provided for adjusting the line pressure P1 to produce a substantially constant modulated pressure Pm in the conduit 322. The conduit 320, as well as being connected via the conduit 138 to the port 194 of the brake control valve 180, is also connected via the conduit 326 and the throttling element 282 to a port 210 of the clutch control valve 200.

This clutch control valve 200 is likewise constituted as a spool valve, and comprises a first longest valve element 202, a second shorter valve element 204, and a third shortest valve element 206 all three of which reciprocatingly slide in a bore. Between the first longest valve element 202 and the second shorter valve element 204 there is fitted a compression coil spring 218 which is in a state of compression, and said second shorter valve element 204 and the third shortest valve element 206 are axially abutted together. A position of said valve elements 202, 204 and 206 as rightwardly displaced from the point of view of FIG. 2 is shown on the lower side of the sectional view of that figure, while an opposite position of said valve elements 202, 204 and 206 as leftwardly displaced from said point of view of FIG. 2 is shown on the upper side of said sectional view. A first control pressure chamber to which a first control port 208 opens is defined between the right hand end as seen in the figure of the clutch control valve 200 and the shortest valve element 206, and a second control pressure chamber to which a second control port 210 opens is defined between the two short valve elements 204 and 206 at an intermediate portion of the clutch control valve 200 as seen in the figure, while a counterbalance pressure chamber is defined at the other left end of said clutch control valve 200 as seen in the figure. An output port 214 of this clutch control valve 200 is connected via a conduit 330 and a throttling element 284 to a hydraulic servo pressure chamber 81 of the forward clutch (C1) 80. The more the first longest valve element 202 of the clutch control valve 200 is shifted towards its leftwardly shifted position in the valve bore as seen on the upper side of the center line of said valve 200 in the figure, then the more do certain lands formed on said valve element 202 communicate the output port 214 to an input port 212 of this valve 200 to which a supply of the line pressure P1 is fed via a branch conduit 328 and via the conduit 300 from the drive range output port 116 of the manual range setting valve 110, of course when and only when said manual range setting valve 110 is set to the "D" or drive range. On the other hand, the more said first longest valve element 202 of the clutch control valve 200 is shifted towards its rightwardly shifted position in the valve bore as seen on the lower side of the center line of said valve 200 in the figure, then the more do said certain lands formed on said valve element 202 communicate said output port 214 to a drain port 216. so as to bias said valve elements 202, 204 and 206 rightwards as seen in the figure in the bore of this clutch control valve 200. The pressure at the output port 214 is fed to the aforementioned counterbalance pressure chamber at the left end of the clutch control valve 200 as seen in the figure, via a passage formed in the valve element 202 and only schematically shown. Thereby, by a feedback process, when of course the manual range setting valve 110 is set to the "D" or drive range, the output pressure at the output port 214 of this clutch control valve 200 is determined according to the biasing force which is being exerted on the first longest valve element 202 thereof in the leftward direction as seen in FIG. 2, and is the greater, the greater is said leftwards biasing force. This leftward biasing force is supplied (being transmitted by the shorter valve elements 204 and 206) by the actions of the pressures supplied to the control pressure chambers defined above through the control ports 208 and 210 of this valve, as well as of course by the biasing action of the compression coil spring 218.

Further, a point on the conduit 330 between the servo pressure chamber 81 of the forward clutch (C1) 80 and the throttling element 284 is connected via a one way valve 260 to the conduit 328. The sense of the one way valve 260 is to allow flow only from the conduit 330 to the conduit 328, i.e. drain flow, but not to allow any flow in the reverse direction.

OPERATION OF THIS HYDRAULIC CONTROL SYSTEM

This preferred embodiment of the automatic transmission hydraulic control system of the present invention operates as follows.

When the manual range setting valve 110 is set to "D" or drive range, then, when the transmission is set to its first speed stage, the valve element 132 of the first-/second speed shift valve 130 will be in its downwardly displaced position as seen on the left side of said valve in FIG. 2, while the valve element 142 of the second/third shift valve 140 will be in its upwardly displaced position as seen on the right side of said valve in FIG. 2. While creep reduction control and hill hold control are both not started, and an OFF signal, i.e. a pulse signal of zero duty ratio, is being sent by the electronic transmission control system to the solenoid valve 240, then the signal pressure Ps in the conduit 320 will be substantially the same as the output pressure Pm of the modulator valve 250. This signal pressure Ps is supplied to the port 194 of the brake control valve 180 and to the port 210 of the clutch control valve 200. Therefore, the valve element 182 of the brake control valve 180 will be in its leftwardly displaced position as seen on the upper side of said valve in FIG. 2, i.e. said brake control valve 180 will be set to its hill hold release position, so the port 186 thereof is in the closed condition, and the port 188 thereof will be drained through the port 187, while the port 190 is connected to the port 192. Therefore the line pressure P1 is transmitted via the conduits 300 and 314 and through this brake control valve 180 and via the conduit 316 to the control port 208 of the clutch control valve 200, and thereby said clutch control valve 200 will be forcibly shifted to its leftwardly displaced position as seen on the upper side of said valve in FIG. 2, i.e. to its normal mode position, by the combined effect of the signal pressure Ps which is being supplied to its control port 210 and also of the line pressure P1 which is thus being supplied to its control port 208 and which acts as an override pressure. Thus, in this condition, the drain port 216 of this clutch control valve 200 is definitely completely closed, since the line pressure P1 which is being supplied to the control port 208 functions as an override pressure for switching said clutch control valve 200, and the line pressure P1 which is being supplied to the port 212 of said valve 200 is transmitted without any reduction to the output port 214, and thence passes via the conduit 330 and the throttling device 284 to the servo pressure chamber 81 of the forward clutch (C1) 80. Therefore, at this point, said forward clutch (C1) 80 is substantially completely engaged, and the first speed stage of the transmission is engaged. At this time, the port 186 of the brake control valve 180 is completely closed, and the port 188 thereof is connected to a drain, and also the port 136 of the first/second speed shift valve 130 is closed while the port 138 thereof is connected to a drain, and accordingly the servo pressure chamber 85 of the second coast brake (B1) 84 is not supplied with any substantial hydraulic fluid pressure, so said second coast brake (B1) 84 is maintained in the released condition.

With the manual range setting valve 110 still being set to "D" or drive range, then, when the throttle opening (engine load) returns to a value indicative of engine idling operation, and also the vehicle road speed is very close to zero, then, in order to carry out creep reduction control and hill hold control, the electronic transmission control system dispatches a pulsed control signal to the solenoid coil 246 of the solenoid valve 240 with a duty ratio D which increases with time. As this duty ratio D increases, the value of the signal pressure Ps in the conduit 320 gradually is decreased, and when said signal pressure value Ps drops so far as to reach the threshold value Psset then the valve element 182 of the brake control valve 180 moves from its leftwardly shifted position from the point of view of FIG. 2 to its rightwardly shifted position. Thereby, the port 188 of said brake control valve 180 is shifted from having been connected to the drain port 187 to now being connected to the port 186, and also the port 192 of said brake control valve 180 is shifted from having been connected to the port 190 to now being connected to the drain port 198.

Thus, now the line pressure P1 is no longer supplied to the the port 208 of the clutch control valve 200, and accordingly the adjusted value of the pressure produced by said clutch control valve 200, i.e. the value of the pressure produced at the port 214 thereof, is determined by the value of the signal pressure Ps which is being supplied to the port 210 thereof, by a feedback process which will be easily understood by one of ordinary skill in the relevant art. Now, during this idling vehicle operational condition the torque transmission capacity of the forward clutch (C1) 80 is reduced to be slightly more than a capacity of transmitting just the output torque which is currently being produced by the engine of the vehicle. Further, and as the value of the signal pressure Ps continues to drop as explained above, the drain port 216 is communicated more and more to the port 214 which is communicated less and less to the port 212, and accordingly the actuating pressure supplied from said port 214 to the servo pressure chamber 81 of the forward clutch (C1) 80 via the conduit 330 and the throttling device 284 steadily drops. Thereby, the engagement pressure for this forward clutch (C1) 80 is steadily dropped, whereby its torque transmission capacity is steadily diminished, and said forward clutch (C1) 80 comes to be no longer fully engaged, and is allowed to slip at least to a certain amount. Thereby, transmission of engine torque from the torque converter mechanism 20 to the front ring gear 68, which is the input member of the main gear transmission mechanism 60, is inhibited, and this prevents creeping of the vehicle as well as reducing the idling vibration. Thus, creep reduction control is implemented.

Further, because the brake control valve 180 is switched over as above described, since the ports 186 and 188 thereof are now communicated together, therefore if the valve element 142 of the second/third shift valve 140 is in its upwardly shifted position from the point of view of FIG. 2, i.e. is in its switched position for the provision of the first speed stage or of the second speed stage, then the line pressure P1 which is available at the drive range output port 116 of the manual range setting valve 110 will be transmitted through the conduits 300 and 302, via the ports 146 and 150 of this second/third shift valve 140 which are connected together at this time, via the conduit 306, via the ports 186 and 188 of the brake control valve 180 which are connected together at this time, via the conduit 312, and via the check valve 170 and the conduit 314 to the port 136 of the first/second speed shift valve 130. Therefore, if currently the valve element 132 of this first/second speed shift valve 130 is in its upwardly shifted position from the point of view of FIG. 2, i.e. is in its switched position for the provision of the second speed stage, the third speed stage, or the overdrive speed stage, then this line pressure will further be transmitted from said port 136 of this first/second speed shift valve 130 to the port 138 thereof which is communicated to this port 136 at this time, and thence will be transmitted via the conduit 316 to the servo pressure chamber 85 of the second coast brake (B1) 84. Accordingly, said second coast brake (B1) 84 will be engaged, and the intermediate shaft 66 bearing the sun gears 62 and 64 of the main gear transmission mechanism 60 will be rotationally fixed with respect to the casing of the transmission. By this action, the rotation of said sun gears 62 and 64 will be prevented, and accordingly by the action of the one way clutch (F2) 92 the power output shaft 34 of the transmission as a whole will be prevented from rotating in the direction to allow the vehicle to move in the reverse direction, and thereby hill hold control is implemented. At this time, although the line pressure P1 is being supplied to the servo pressure chamber 85 of the second coast brake (B1) 84, nevertheless, because of the action of the check ball 178 of the check valve 170 to block the port 172 thereof for preventing backwards flow of said line pressure to the second coast modulator valve 160, no problem arises with regard to such reverse flowing.

Figure 3:
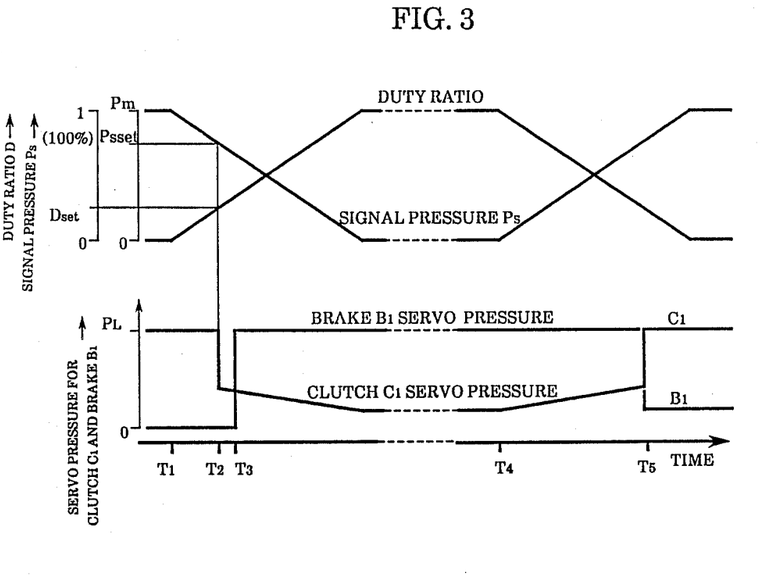
FIG. 3 is a set of four coordinated time charts, in all of which the progress of time is shown along the horizontal axis, for illustrating the time behavior of a duty ratio and of various hydraulic fluid pressures, during the operation of said preferred embodiment automatic transmission hydraulic control system.

DISCUSSION WITH REFERENCE TO THE TIME CHARTS OF FIG. 3

In the four coordinated time charts of FIG. 3, the progress of time is shown along the horizontal axis, and there are shown, in a coordinated fashion, the time behaviors during the operation of this preferred embodiment automatic transmission hydraulic control system of the duty ratio D of the pulse signal fed by the electronic transmission control system to the solenoid valve 240, of the signal hydraulic fluid pressure Ps outputted by said solenoid valve 240, of the actuating hydraulic fluid pressure supplied via the conduit 330 to the servo pressure chamber 81 of the forward clutch (C1) 80, and of the actuating hydraulic fluid pressure supplied via the conduit 316 to the servo pressure chamber 85 of the second coast brake (B1) 84.

Starting at the left side of FIG. 3, therefore, at the time point T1 the duty ratio D of the pulse signal fed by the electronic transmission control system to the solenoid valve 240 starts to increase steadily from a zero level, so as to start the creep reduction control, and in accordance with this the signal hydraulic fluid pressure Ps outputted by said solenoid valve 240 starts to decrease steadily from the pressure value Pm which is being outputted by the modulator valve 250.

Subsequently, at the time point T2, said duty ratio D of the pulse signal fed by the electronic transmission control system to the solenoid valve 240 rises up as far as a determinate threshold value Dset, at which the signal hydraulic fluid pressure Ps outputted by said solenoid valve 240 drops down to the determinate threshold value Psset, and at this point the valve element 182 of the brake control valve 180 is switched from its leftwardly shifted position from the point of view of FIG. 2 to its rightwardly shifted position, i.e. to its hill hold control position. At this time, the line pressure P1 ceases from being supplied to the port 208 of the clutch control valve 200.

Next, after a certain time interval, at the time point T3, the valve element 132 of the first/second speed shift valve 130 is shifted from its downwardly shifted position from the point of view of FIG. 2, i.e. from its switched position for the provision of the first speed stage, to its upwardly shifted position, i.e. to its switched position for the provision of the second speed stage, the third speed stage, or the overdrive speed stage, and at this time supply of the line pressure P1 is transmitted via the conduit 316 to the servo pressure chamber 85 of the second coast brake (B1) 84. Accordingly, at this time, hill hold control is implemented as explained earlier.

Therefore, the starting of the hill hold control does not depend only upon the switching over of the brake control valve 180; but, on the contrary, after the switching over of said brake control valve 180, the hill hold control can be started at any time by the switching over of the first/second speed shift valve 130, and accordingly the starting point of the hill hold control can be desired to be in any of a variety of operational points of the transmission with respect to the execution of creep reduction control.

If, by some error of the system, a pulse signal with duty factor D sufficiently great to switch the brake control valve 180 to its rightwardly shifted position, i.e. to its hill hold control position, is supplied to the solenoid valve 240, and even if the first/second speed shift valve 130 is switched into its upwardly shifted position, i.e. to its switched position for the provision of the second speed stage, the third speed stage, or the overdrive speed stage, then nevertheless, provided that the valve element 142 of the second/third shift valve 140 is not shifted to its upwardly shifted position from the point of view of FIG. 2, i.e. is not shifted to its switched position for the provision of the first speed stage or of the second speed stage, then the line pressure P1 cannot be transmitted to the servo pressure chamber 85 of the second coast brake (B1) 84, and therefore said second coast brake (B1) 84 cannot be mistakenly engaged. This is done because, as can be seen from the Table given earlier, when said valve element 142 of the second/third shift valve 140 is shifted to its downwardly shifted position from the point of view of FIG. 2, i.e. is shifted to its switched position for the provision of the third speed stage or of the fourth speed stage, then the direct clutch (C2) 82 is engaged; while, on the other hand, when said valve element 142 of said second/third shift valve 140 is shifted to its upwardly shifted position from the point of view of FIG. 2, i.e. is shifted to its switched position for the provision of the first speed stage or of the second speed stage, then the direct clutch (C2) 82 is not engaged. Accordingly, by the action explained above, it is positively prevented that the direct clutch (C2) 82 and the second coast brake (B1) 84 can be engaged at the same time. Thus, the double locking of said direct clutch (C2) 82 and said second coast brake (B1) 84 is prevented.

Further, when the first/second speed shift valve 130 is in its downwardly shifted position, i.e. is in its switched position for the provision of the first speed stage, then its port 136 and its port 138 are disconnected from one another, and instead said port 138 is connected to the drain port 139, and this action ensures that, when the first speed stage is engaged, it is positively prevented that the second coast brake (B1) 84 should be engaged. This prevents the second speed stage from, wrongly and mistakenly, being provided at this time. Further, at this time, although the second coast modulate pressure is being supplied to the servo pressure chamber 85 of the second coast brake (B1) 84, nevertheless, now because of the action of the check ball 178 of the check valve 170 to block the port 174 thereof for preventing backwards flow of said second coast modulate pressure to the brake control valve 180, no problem arises with regard to such reverse flowing.

When the manual range setting valve 110 is set to the "S" or second range, then the line pressure Pl appears at its second range output port 118, and is supplied via the conduit 304 to the port 148 of the second/third shift valve 140. If at this time said second/third shift valve 140 is shifted to its upwardly shifted position from the point of view of FIG. 2, i.e. is shifted to its switched position for the provision of the first speed stage or of the second speed stage, then this line pressure at its port 148 is transmitted to its port 152 and is supplied via the conduit 308 to the second coast modulator valve 160, which reduces its pressure to a certain pressure level value. This pressure is then supplied as a second coast modulator pressure via the conduit 310 and the check valve 170 and via the conduit 314 to the port 136 of the first/second speed shift valve 130. If, then, said first/second speed shift valve 130 is in its upwardly shifted position, i.e. is in its switched position for the provision of the second speed stage, the third speed stage, or the overdrive speed stage, then this second coast modulator pressure thus supplied to its port 136 will be transmitted from its port 138 connected to said port 136 and via the conduit 316 to the servo pressure chamber 85 of the second coast brake (B1) 84, thus engaging said second coast brake (B1) 84. Accordingly, in these operational conditions, it is this second coast modulator pressure which is used for engaging said second coast brake (B1) 84; and thus it is seen that, in the second speed stage when the "S" or second range is the one set by the driver of the vehicle on the manual range setting valve 110, the engagement pressure of the second coast brake (B1) 84 can be set to any desired and appropriate value.

Next, at the time point T4 of FIG. 3, when it is desired to establish the first speed stage of the transmission mechanism in order to start off the vehicle from rest, and thus it is required to release the hill hold control and the creep reduction control, the duty factor D of the pulse signal supplied by the electronic transmission control system to the solenoid coil 246 of the solenoid valve 240 starts to be steadily reduced. Thereby, the signal hydraulic fluid pressure Ps outputted by said solenoid valve 240 in the conduit 320 starts to be gradually and steadily increased along with this decrease of the duty factor D, and, as the signal hydraulic fluid pressure Ps thus supplied to the port 210 of the clutch control valve 200 gradually and steadily increases, the drain port 216 is communicated less and less to the port 214 which is communicated more and more to the port 212, and accordingly the actuating pressure supplied from said port 214 to the servo pressure chamber 81 of the forward clutch (C1) 80 via the conduit 330 and the throttling device 284 gradually and steadily increases. Thereby, this forward clutch (C1) 80 comes to be more and more fully engaged, and its degree of slippage is progressively released. Thus, creep reduction control comes to be de-implemented.

Subsequently, at the time point T5 of FIG. 3, when the value of the signal hydraulic fluid pressure Ps outputted by the solenoid valve 240 reaches the threshold value Psset therefor, it is deemed that then the engagement pressure of the forward clutch (C1) 80 is sufficient and has slightly exceeded that engagement pressure which provides a torque transmission capacity for said forward clutch (C1) 80 which is able to handle the amount of torque which is being outputted by the engine of the vehicle during the idling operational condition, and thus even if the second coast brake (B1) 84 is released the vehicle will not roll backwards. Therefore, at this time, the supply of this signal pressure Ps to the port 194 of the brake control valve 180 shifts the valve member 182 thereof in the leftward direction in the figure, i.e. to its hill hold control release position, and thereby the port 186 of this brake control valve 180 comes to be closed while the port 188 thereof comes to be drained, and accordingly the pressure is positively drained from the servo pressure chamber 85 of the second coast brake (B1) 84. Thereby, even if the first-/second speed shift valve 130 is not switched over to its position shown on the left side of said valve 130 in the figure for providing the first speed stage, nevertheless the second coast brake (B1) 84 is released, so that the vehicle can start off from rest.

Further, at this time point T5 when the valve member 182 of the brake control valve 180 switches over in the leftward direction in the figure to its hill hold control release position, at this time the port 192 of said valve 180 is switched from being communicated to the drain port 198 to now be connected to the port 190, and accordingly the port 208 of the clutch control valve 200 comes to be supplied with the line pressure Pl, via the conduit 316. This clutch control valve 200 is therefore switched over to its normal mode position, and the drain port 216 thereof is completely closed, while its port 212 is put into substantially complete communication with its port 214. Accordingly the servo pressure chamber 81 of the forward clutch (C1) 80 is supplied with the full line pressure Pl, and therefore said forward clutch (C1) 80 is returned to the completely engaged state, in a coupled relation with the brake control valve 180 switchover operation as explained above, and the first speed stage is definitively established so that the vehicle can be started away from rest. Thus, according to this construction, it will be seen that, when the hill hold condition is released by the release of the second coast brake (B1) 84, it is positively prevented that the vehicle should roll backwards due to the supply of insufficient actuating pressure to the forward clutch (C1) 80.

In the above described preferred embodiment of the automatic transmission hydraulic control system of the present invention, the port 196 of the brake control valve 180 is supplied with the throttle hydraulic pressure or alternatively with the actuating pressure for the forward clutch (C1) 80, thus ensuring that: when the throttle hydraulic pressure is at least a certain determinate value, i.e. the load on the engine (not particularly shown) of the vehicle is greater than idling engine load, or alternatively when the actuating pressure for said forward clutch (C1) 80 is at least a certain determinate value, i.e. creep reduction control implemented by the reduction of said actuating pressure for said forward clutch (C1) 80 is not being carried out, then said brake control valve 180 is forcibly switched to the hill hold control release position, and the engagement of the second coast brake (B1) 84 is positively prohibited.

It is acceptable, according to the principle of the present invention, if the constructional details of the system are varied, although the shown ones are considered to be preferred. Therefore, although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For an automatic transmission for a vehicle comprising an engine, comprising a source of actuating hydraulic fluid pressure, a gear transmission mechanism which comprises a power output shaft and a plurality of hydraulic fluid pressure actuated friction engaging mechanisms and which is capable of providing any one of a plurality of speed stages according to patterns of engagement and release of said hydraulic fluid pressure actuated friction engaging mechanism, and a hydraulic speed stage switching system having a plurality of shift valves and switching over supply and non supply of actuating hydraulic fluid pressure to said friction engaging mechanisms; said friction engaging mechanisms including a shift brake and according to engagement of which said power output shaft of said gear transmission mechanism is prevented from turning in a direction to a hydraulic hill hold control system, comprising:
   (a) a first control means for opening a port passage when said vehicle is substantially stationary and said engine is substantially in idling operational condition; and
   (b) a second control means for setting up a first hydraulic fluid passage in said hydraulic speed stage switching system when said gear transmission mechanism is switched to a certain speed stage and supplying actuating hydraulic fluid pressure to said shift brake via said port passage of said first control means and said first hydraulic fluid passage set up in said hydraulic speed stage switching system so as to engage said shift brake when said first control means opens said port passage and said gear transmission mechanism is switched to said certain speed stage.

2. A hydraulic hill hold control system according to claim 1, wherein said gear transmission mechanism comprises a first planetary gear mechanism having a first sun gear a first ring gear first planetary pinions and a first carrier, a second planetary gear mechanism having a second sun gear a second ring gear, second planetary pinions and a second carrier, a rotational member connecting said first sun gear with said second sun gear, a first clutch, an input member connected with said first ring gear via said first clutch, a second clutch for selectively connecting said input member with said rotational member, a first brake for selectively braking said rotational member, a series connection of a second brake and a first one way clutch for selectively braking said rotational member only in one rotational direction, a third brake for selectively braking said second carrier, and a second one way clutch for braking said second carrier only in one rotational direction, said output shaft being connected with said first carrier and said second ring gear; said hydraulic speed stage switching system comprises a first/second shift valve having a port passage forming a part of said first hydraulic fluid passage and adapted to be opened when said first/second shift valve is switched to a first position to set up second and third speed stages and closed when said first/second shift valve is switched to a second position to set up first speed stage, and a second/third shift valve having a port passage forming a part of said first hydraulic fluid passage and adapted to be opened when said second/third shift valve is switched to a position to set up first and second speed stages and closed when said second/third shift is switched to a position to set up third speed stage, said first/second shift valve being spring biased to said first position and shifted towards said second position by a throttle pressure which increases with increase of engine load.

3. A hydraulic hill hold control system according to claim 1, wherein said automatic transmission further comprises an anti creep control means for decreasing actuating hydraulic fluid pressure supplied to a clutch for decreasing actuating hydraulic fluid pressure supplied to a clutch of said friction engaging mechanisms; said first control means comprises a hydraulic fluid pressure control valve common to said anti creep control means and providing a first signal pressure which is normally high during operation of said automatic transmission and low when anti creep and hill hold are to be provided; said anti creep control means has a first signal port adapted to be supplied with said first signal pressure and opens said port passage when said first signal pressure supplied to said signal port thereof is low; said anti creep control means further comprises a second signal port and stops the action of decreasing said actuating hydraulic fluid pressure supplied to said clutch when a second signal pressure is supplied to said second signal port; and said first control means is adapted to provide said second signal pressure when said first control means stops to open said port passage; said second signal pressure, when provided, being supplied to said second signal port of said anti creep control means.

4. A hydraulic hill hold control system according to claim 3, wherein said hydraulic fluid pressure control valve is a solenoid valve which has a drain port, a valve element for throttling said valve port, and a solenoid for driving said valve element, said valve element being adapted to provide a variably throttled opening of said drain port according to a duty ratio of electric current supplied to said solenoid.

5. A hydraulic hill hold control system according to claim 3, wherein said solenoid valve is of a normally closed type so that said drain port is closed when no current is supplied to said solenoid.

6. A hydraulic hill hold control system according to claim 1, wherein said hydraulic speed stage switching system sets up a second hydraulic fluid passage for supplying actuating hydraulic fluid pressure to said shift brake when said gear transmission mechanism is switched to a certain speed stage, said hydraulic hill hold control system further comprising a passage joint means for connecting said first hydraulic fluid passage with said second hydraulic fluid passage, and a check valve means incorporated in said passage joint means for preventing actuating hydraulic fluid to flow from said second hydraulic fluid passage to said first hydraulic fluid passage through said passage joint means towards said port passage of said first control means.

* * * * *